United States Patent
Lee et al.

(10) Patent No.: US 9,649,597 B2
(45) Date of Patent: May 16, 2017

(54) POLYAMIDE WATER-TREATMENT SEPARATION MEMBRANE WITH IMPROVED ANTIFOULING PROPERTIES AND MANUFACTURING METHOD THEREOF

(71) Applicant: LG CHEM, LTD., Seoul (KR)

(72) Inventors: Phill Lee, Daejeon (KR); Jae-Hong Kim, Daejeon (KR); Chong-Kyu Shin, Daejeon (KR); Joung-Eun Yoo, Daejeon (KR); Seung-Pyo Jeong, Daejeon (KR); Young-Ju Lee, Daejeon (KR); Young-Hoon Ko, Daejeon (KR); Hye-Jin Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 488 days.

(21) Appl. No.: 14/197,204

(22) Filed: Mar. 4, 2014

(65) Prior Publication Data
US 2014/0183128 A1 Jul. 3, 2014

Related U.S. Application Data

(63) Continuation-in-part of application No. PCT/KR2013/008183, filed on Sep. 10, 2013.

(30) Foreign Application Priority Data

Nov. 5, 2012 (KR) .................. 10-2012-0124487
Sep. 10, 2013 (KR) .................. 10-2013-0108427

(51) Int. Cl.
*B01D 71/56* (2006.01)
*B01D 63/00* (2006.01)
(Continued)

(52) U.S. Cl.
CPC ....... *B01D 61/025* (2013.01); *B01D 67/0088* (2013.01); *B01D 67/0093* (2013.01);
(Continued)

(58) Field of Classification Search
CPC .... B01D 71/56; B01D 67/0093; B01D 69/12; B01D 61/025; B01D 65/08;
(Continued)

(56) References Cited

U.S. PATENT DOCUMENTS 4,505,985 A  3/1985 Schmidt et al.
6,280,853 B1 * 8/2001 Mickols ............ B01D 67/0093
                                                210/490

(Continued)

FOREIGN PATENT DOCUMENTS

EP         2965802 A1 *  1/2016
KR   10-2008-0075765 A    8/2008
(Continued)

OTHER PUBLICATIONS

Extended European Search Report for European Application No. 13831812.6, dated Sep. 27, 2016.
(Continued)

*Primary Examiner* — Ana Fortuna

(57) ABSTRACT

A water-treatment separation membrane with good antifouling properties includes a support having pores, a polyamide layer formed on the support, and a passivation layer comprising specific materials formed on the polyamide layer.

14 Claims, 2 Drawing Sheets

(51) Int. Cl.
*B01D 39/00* (2006.01)
*B01D 67/00* (2006.01)
*B01D 61/02* (2006.01)
*C02F 1/44* (2006.01)
*B01D 69/12* (2006.01)
*B01D 71/32* (2006.01)
*B01D 71/80* (2006.01)
*B01D 71/52* (2006.01)

(52) U.S. Cl.
CPC .............. *B01D 69/12* (2013.01); *B01D 71/32* (2013.01); *B01D 71/56* (2013.01); *B01D 71/80* (2013.01); *C02F 1/441* (2013.01); *B01D 71/52* (2013.01); *B01D 2325/28* (2013.01); *C02F 1/44* (2013.01)

(58) Field of Classification Search
CPC ............ B01D 2323/38; B01D 67/0088; B01D 67/0006; B01D 2325/36; B01D 71/82; B01D 69/10
See application file for complete search history.

(56) References Cited

U.S. PATENT DOCUMENTS

| | | | |
|---|---|---|---|
| 7,677,398 B2* | 3/2010 | Belfer | B01D 67/0093 210/490 |
| 9,079,139 B2* | 7/2015 | Kwon | B01D 69/02 |
| 9,259,691 B2* | 2/2016 | Ko | B01D 69/02 |
| 2007/0251883 A1* | 11/2007 | Niu | B01D 61/025 210/653 |
| 2009/0220690 A1 | 9/2009 | Niu et al. | |
| 2011/0120942 A1 | 5/2011 | Niu et al. | |
| 2012/0003387 A1 | 1/2012 | Kim et al. | |
| 2014/0183128 A1* | 7/2014 | Lee | B01D 61/025 210/490 |
| 2014/0251892 A1* | 9/2014 | Lee | C02F 1/441 210/321.6 |
| 2015/0274891 A1* | 10/2015 | Konradi | B01D 65/08 210/500.32 |

FOREIGN PATENT DOCUMENTS

| WO | WO 2012/148359 A1 | 11/2012 |
| WO | WO 2014/069786 * | 8/2014 |
| WO | WO 2014/137049 * | 9/2014 |

OTHER PUBLICATIONS

D. Rana et al., "Surface Modifications for Antifouling Membranes", Chemical Reviews, Apr. 14, 2010, pp. 2448-2471, vol. 110, No. 4, American Chemical Society.

A. Hamza et al., "Development of membranes with low surface energy to reduce the fouling in ultrafiltration applications", Journal of Membrane Science, Aug. 6, 1997, pp. 217-227, vol. 131, Elsevier Science B.V.

Wenjuan Chen et al., "Efficient Wastewater Treatment by Membranes through Constructing Tunable Antifouling Membrane Surfaces", Environmental Science & Technology, Jun. 28, 2011, pp. 6545-6552, vol. 45, ACS Publications.

* cited by examiner

POLYAMIDE WATER-TREATMENT SEPARATION MEMBRANE WITH IMPROVED ANTIFOULING PROPERTIES AND MANUFACTURING METHOD THEREOF

CROSS-REFERENCE TO RELATED APPLICATIONS

This application claims the priority to Korean Patent Application Nos. 10-2012-0124487 filed on Nov. 5, 2012 and 10-2013-0108427 filed on Sep. 10, 2013, in the Korean Intellectual Property Office, as well as PCT/KR2013/008183, the disclosures of which are incorporated herein by reference.

BACKGROUND

Embodiments of the present invention relate to a polyamide water-treatment separation membrane and a manufacturing method thereof, and more particularly, to a polyamide water-treatment separation membrane having improved antifouling properties with a coating layer including a specific compound formed on a polyamide membrane, and a manufacturing method thereof.

Osmosis occurs when two solutions of different concentration are isolated by a semi-permeable membrane and solvent flows from a solution having a lower concentration of solute to another solution having a higher concentration of solute. The pressure applied to the solution having the higher concentration of the solute by the movement of the solution is known as osmotic pressure. When a external pressure higher than the osmotic pressure is applied to the higher concentration side, the solvent may move from the solution having the higher concentration of the solute to the solution having the lower concentration of the solute. This phenomenon is known as reverse osmosis. By using the principle of reverse osmosis, various salts and organic materials may be separated by the semi-permeable membrane by using a pressure gradient as a driving force. A water-treatment membrane may be used for separating materials on the molecular level, removing salts from saline water and seawater, and providing water for domestic, commercial and industrial use by using the reverse osmosis phenomenon.

A polyamide membrane is an example of such a water treatment separation membrane. The polyamide water-treatment membrane is manufactured by forming an active polyamide layer on a support having pores with a small pore size. The minute and support having pores may be formed by forming a polysulfone layer on a non-woven fabric, impregnating the minute and support having pores with an aqueous m-phenylenediamine (mPD) solution to form an mPD layer, and impregnating the mPD layer with a trimesoyl chloride (TMC) organic solution so that the mPD layer contacts the TMC to allow for interfacial polymerization and to form a polyamide layer.

Some commercial applications may require certain conditions to be met by a separation membrane. One of the conditions is a high salt rejection rate. A commercially required salt rejection rate for the water-treatment membrane may be 97% or above with respect to brackish water. Other desirable characteristics include high flux by which a relatively large amount of water may be transmitted under a relatively low pressure. In general, the preferred permeation flux of a membrane is about 10 gallons/ft$^2$-day (gfd) under a pressure of 800 psi for sea water, and 15 gfd or above under a pressure of 220 psi for saline water.

Recently, prevention of fouling of a membrane has been recognized as a potential area for improvement along with other characteristics, such as the salt rejection rate and the permeation flux. When a membrane is fouled, floating materials or dissolved materials may be attached to the surface of the membrane. When the fouling occurs, permeation flux may be decreased due to adsorption and growth of microorganisms on the surface of the separation membrane. This may cause secondary pollution such as forming a bio-film on the surface of the separation membrane. Since a polluted separation membrane has decreased permeation properties, frequent corrections of the pressure may be necessary to maintain a constant permeation flux. When the fouling of the membrane is severe, a cleaning process may be required.

SUMMARY OF THE INVENTION

Embodiments of the present invention include a polyamide water-treatment separation membrane minimizing the decrease of permeation flux and having improved antifouling properties by forming a coating layer including a specific compound on a polyamide layer.

Embodiments of the present invention include a water-treatment separation membrane with improved antifouling properties, the membrane including a support having pores, a polyamide layer formed on the support, and a passivation layer formed on the polyamide layer and including a compound represented by following Formula (I):

$$L_1\text{-}A\text{-}L_2\text{-}B\text{-}L_3. \qquad \text{[Formula I]}$$

In which $L_1$ may be an amine, a haloalkyl, a haloalkenyl, a haloalkynyl, a hydroxyl, a ketone, an aldehyde, an acyl halide, a carbonate, an ester, an ether, an imine, an azide, a nitrile, a thiocyanate, a thione, a thial, a phosphate, an epoxide, an acryloyl amine or a thiol.

A may include one or more $C_{1-6}$ alkylene unit, one or more of a $C_{1-6}$ alkylene oxide unit or a combination thereof.

$L_2$ may be at least one selected from the group consisting of the following Formulae (II) to (V).

(II)

(III)

(IV)

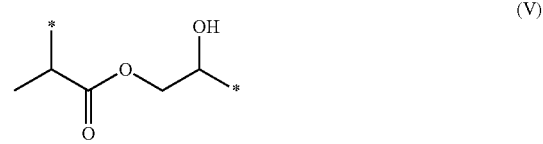

(V)

B may be an unsubstituted $C_{1-20}$ alkylene, aryl alkylene, alkylene oxide, alkenylene, aryl alkenylene or alkenylene oxide or a substituted $C_{1-20}$ alkylene, aryl alkylene, alkylene oxide, alkenylene, aryl alkenylene or alkenylene oxide in which the alkylene, the aryl alkylene, the alkylene oxide, the alkenylene, the aryl alkenylene or the alkenylene oxide is substituted with at least one selected from the consisting of a halogen, a sulfonyl, an amine, a hydroxyl and a ketone, and $L_3$ is —$CF_3$ or —F.

In an embodiment, A may include at least one selected from the group consisting of the following Formulae (VI) to (XII). However, in other embodiments, A is not limited thereto.

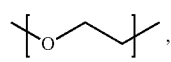
(VI)

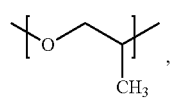
(VII)

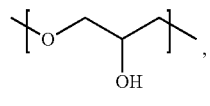
(VIII)

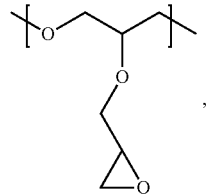
(IX)

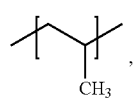
(X)

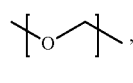
(XI)

(XII)

B may preferably be at least one selected from the group consisting of the following compounds. However, in other embodiments, B is not limited thereto.

—$(CF_2)_n(CH_2)_m$—

($n$ is an integer frm 0 to 10, $m$ is an integer from 0 to 10)

—$(CF_2)_3OCF(CF_3)CH_2$—

—$CF_2CHFCF_2CH_2$—,   —$CF_2CHF$—,

—$(CF_2)_3[CF(CF_3)CF_2O]_2CF(CF_3)$—,

—$(CF_2)_3O[CF(CF_3)CF_2O]_3CF(CF_3)$—,

—$(CF_2)_6CH=CH$—,   —$CF_2OCF_2CF_2$—,

—$CF_2CF_2CH_2OCH_2$—,   —$CF_2CHFCF_2$—,

—$(CF_2)_3CH=CH$—,   —$CF_2CH_2CH=CH$—,

—$CF_2CF_2CF=CF$—,   —$CF_2CH=CH$—,

—$CF=CFCH_2CH_2$—,   —$CF_2-CF(CF_2)_2(CH_2)_2$— with $CF_3$,

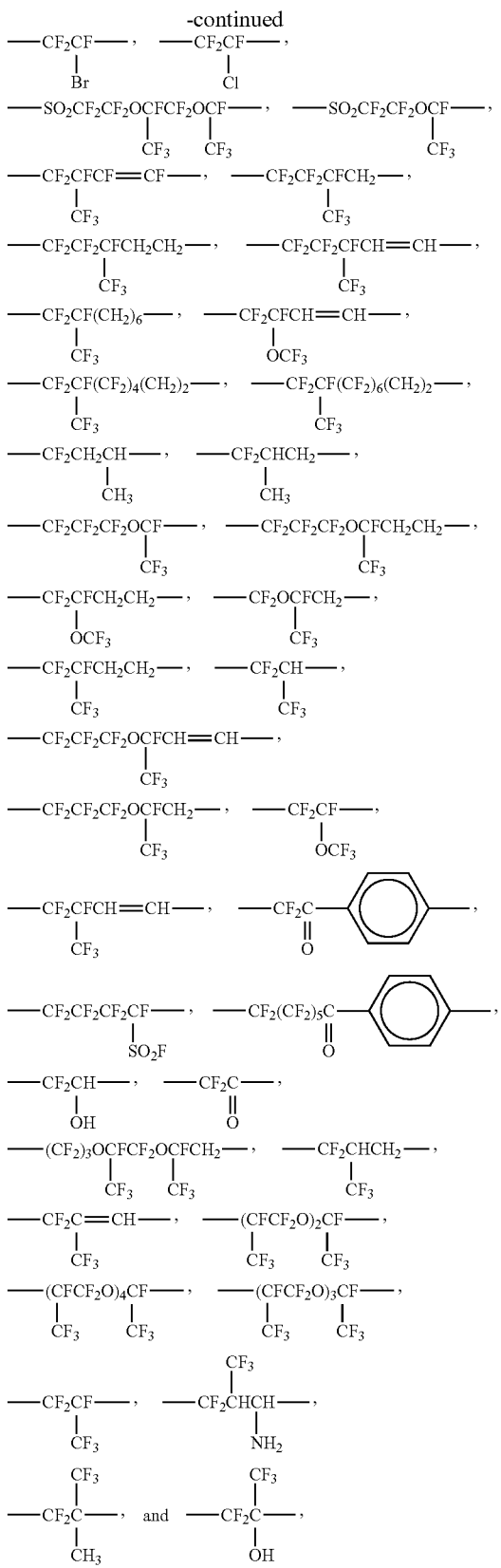

In preferred embodiments, the compound represented by Formula (I) may be selected from the group consisting of the following compounds:

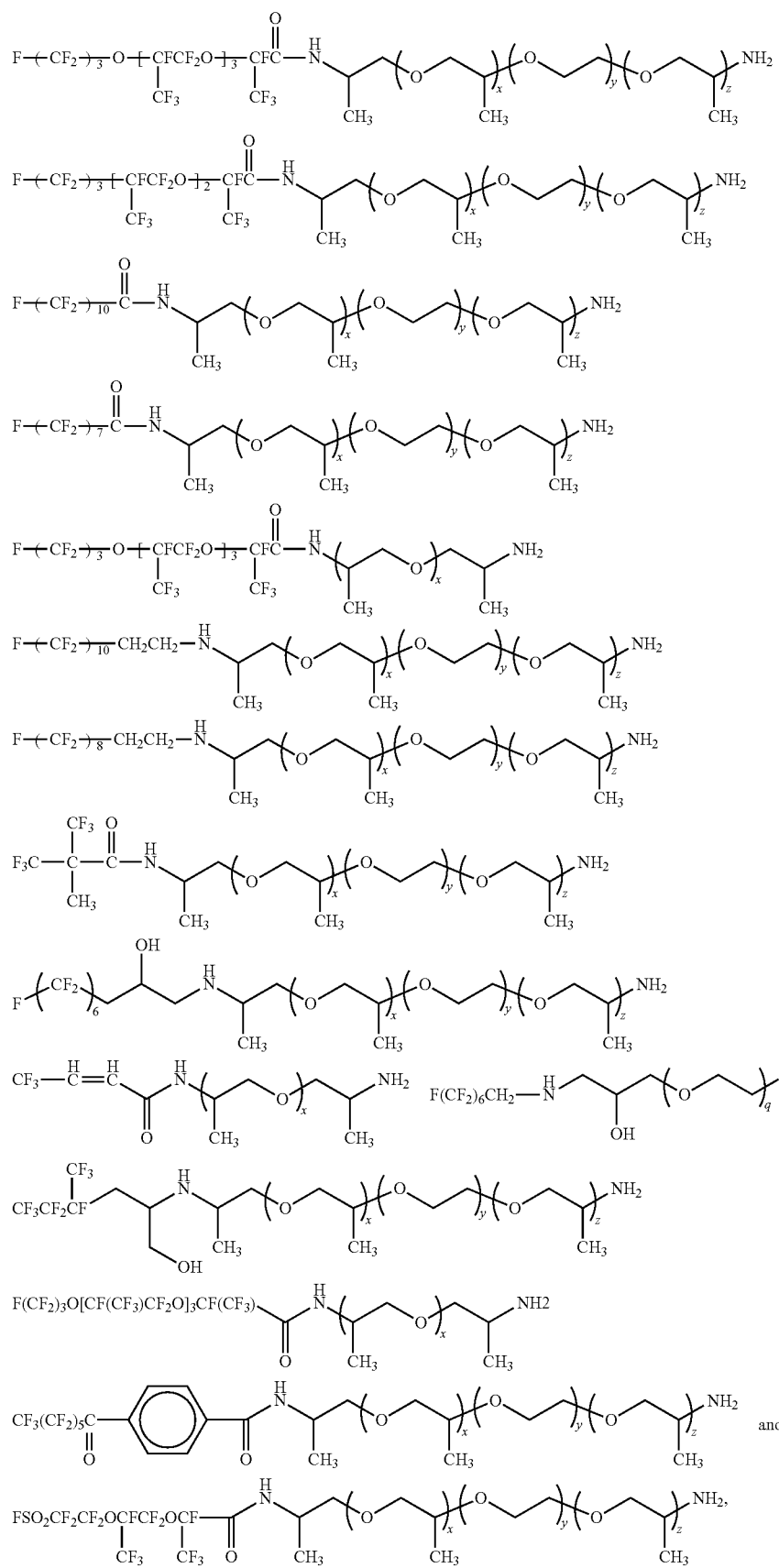

in which each of x, y and z may be an integer from 0 to 70, x+y+z may be an integer from 1 to 70, and q may be an integer from 1 to 150.

An embodiment of the present invention is a method for manufacturing a water-treatment separation membrane. The method may include providing a support having pores and a polyamide layer formed thereon, and forming a passivation layer including a compound represented by Formula (I) on the polyamide layer.

A water-treatment separation membrane according to an embodiment of the present invention has improved antifouling properties with respect to hydrophilic and/or hydrophobic fouling materials compared to conventional membranes. In addition, a water-treatment separation membrane according to an embodiment of the present invention may minimize the extent to which permeation flux is decreased by including a substantial amount of hydrophilic groups in the passivation layer.

DETAILED DESCRIPTION

Hereinafter, specific embodiments of the present invention will be described in detail. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Embodiments of the present invention include a water-treatment membrane having improved antifouling properties for many kinds of polluting materials. A water-treatment separation membrane having improved antifouling properties may be manufactured by forming a passivation layer including a compound represented by the following Formula (I) on a polyamide layer.

In an embodiment, a water-treatment separation membrane includes a support having pores, a polyamide layer formed on the support, and a passivation layer formed on the polyamide layer and including a compound represented by Formula (I).

Figure 1:
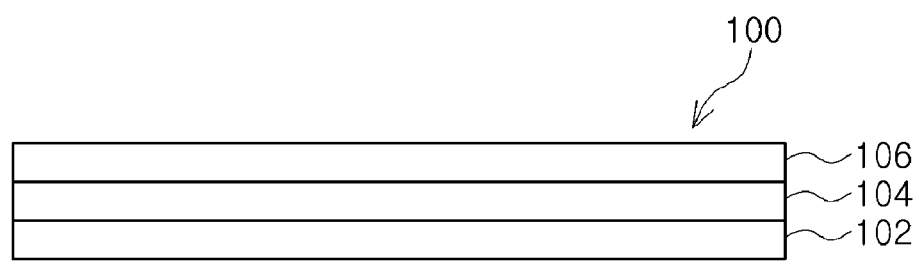
FIG. 1 illustrates a water treatment separation membrane including a support having pores, a polyamide layer, and a passivation layer.

For example, FIG. 1 illustrates a water treatment separation membrane 100 including a support having pores 102 (pores not shown), a polyamide layer 104, and a passivation layer 106.

The support having pores may be obtained by forming a coating layer of a polymer material on a non-woven fabric. The polymer material may include, for example, polysulfone, polyether sulfone, polycarbonate, polyethylene oxide, polyimide, polyetherimide, polyetheretherketone, polypropylene, polymethylpentene, polymethyl chloride, polyvinylidene fluoride, or the like. However, embodiments of the polymer material are not limited to these examples. In particular, polysulfone has properties that are well suited to some embodiments.

The polyamide layer may be formed by interfacial polymerization of an amine compound with an acyl halide compound. In an embodiment, the amine compound may be, for example, m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine, or a mixture thereof. However, the amine compound is not limited to these examples. In an embodiment, the acyl halide compound preferably includes trimesoyl chloride, isophthaloyl chloride, terephthaloyl chloride, or a mixture thereof. However, the acyl halide compound is not limited to these examples.

A water-treatment separation membrane according to an embodiment of the present invention includes a passivation layer including a compound represented by the following Formula (I) on the polyamide layer:

$$L_1\text{-}A\text{-}L_2\text{-}B\text{-}L_3. \quad \text{[Formula I]}$$

In Formula (I), $L_1$ is a functional group that may react with the functional groups in the polyamide layer, including an amine, an amide, an acyl halide, a carboxylic acid functional group, and the like. $L_1$ may be, for example, an amine, a haloalkyl, a halolkenyl, a haloalkynyl, a hydroxyl, a ketone, an aldehyde, an acyl halide, a carbonate, an ester, an ether, an imine, an azide, a nitrile, a thiocyanate, a thione, a thial, a phosphate, an epoxide, an acryloylamine or a thiol.

A may include at least one $C_{1\text{-}6}$ alkylene unit, at least one $C_{1\text{-}6}$ alkylene oxide unit, or a combination thereof. In an embodiment, the alkylene unit or the alkylene oxide unit may be substituted with an alkyl group, a hydroxyl group, an epoxy group, an oxide group, or the like. For example, A may include one or more selected from the group consisting of the following Formulae (VI) to (XII):

 (VI)

 (VII)

 (VIII)

 (IX)

 (X)

 (XI)

 (XII)

More preferably, A may be a combination of repeating units selected from a group consisting of the Formula (VII), Formula (VI) and Formula (X) shown above.

$L_2$ may be at least one selected from the group consisting of the following Formulae (II) to (V):

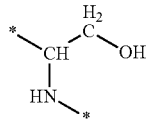
(II)

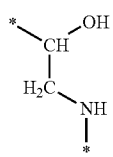
(III)

(IV)

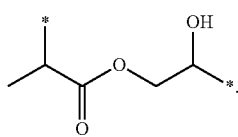
(V)

B may be a substituted or unsubstituted $C_{1-20}$ alkylene, aryl alkylene, alkylene oxide, alkenylene, aryl alkenylene or alkenylene oxide. In an embodiment, the alkylene, the aryl alkylene, the alkylene oxide, the alkenylene, the aryl alkenylene and the alkenylene oxide may be substituted with one or more selected from the group consisting of a halogen group, a sulfonyl group and an amide. More particularly, B may include one or more selected from the group consisting of the following compounds:

—$(CF_2)_n(CH_2)_m$—

($n$ is an integer frm 0 to 10, $m$ is an integer from 0 to 10)

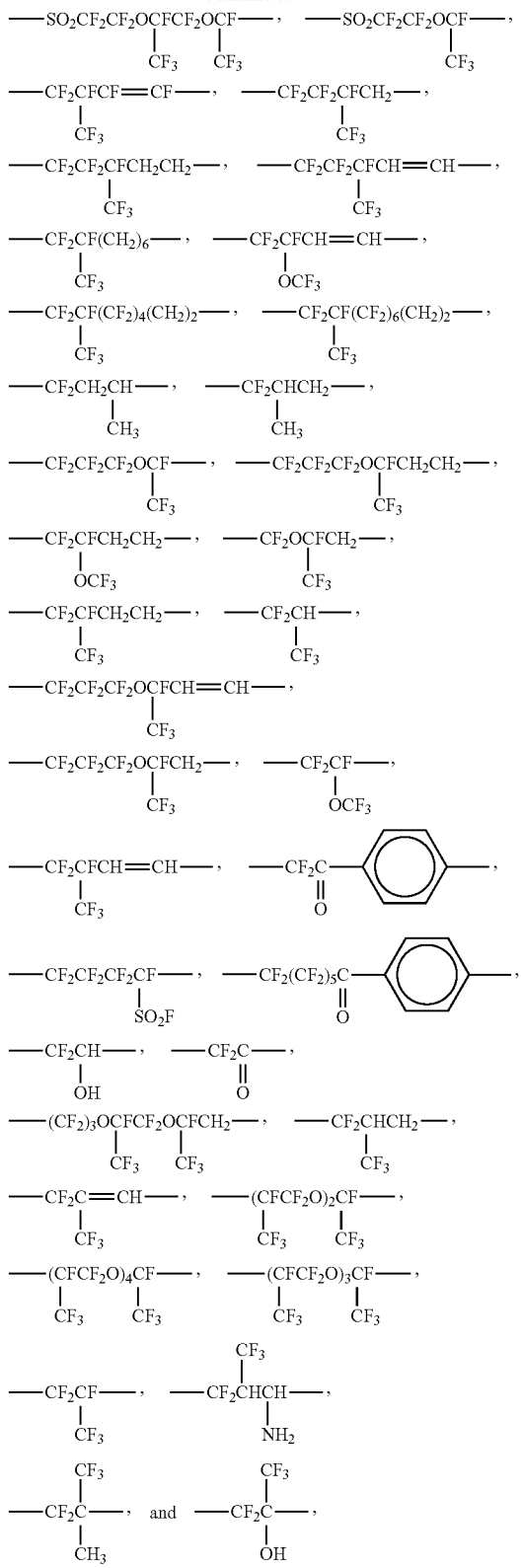

Finally, $L_3$ may be —$CF_3$ or F.

Specific examples of the compound represented by Formula (I) include the following compounds. However, embodiments are not limited to these examples.

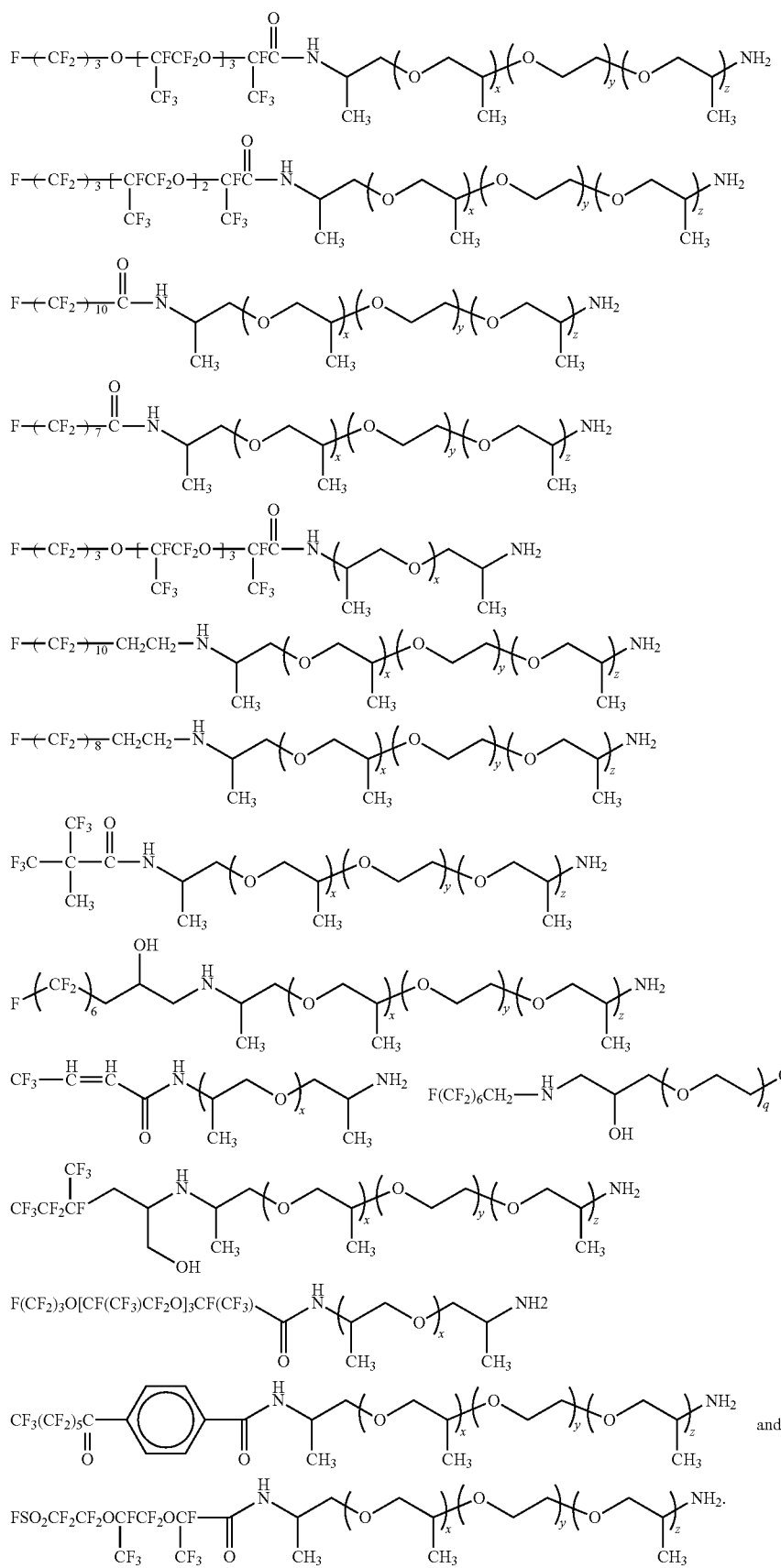

In the above compounds, each of x, y and z may be 0 to 70, and preferably, x+y+z may be 1 to 70, and q may be 1 to 150.

The compound represented by Formula (I) may be prepared by mixing $L_1$-A-Z (hereinafter, reactant 1) and W—B-$L_3$ (hereinafter, reactant 2) in a 1:1 molar ratio, and reacting as illustrated in the following Reaction Equation 1:

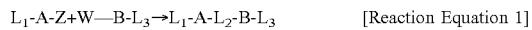  [Reaction Equation 1]

Here, each of $L_1$, A, $L_2$, B and $L_3$ may be the same as described above. Z and W may be functional groups that form $L_2$ through a hydrolysis-condensation reaction. For example, Z and W may be an amine group, an epoxide group, an acyl halide group or a hydroxyl group.

In a water-treatment separation membrane according to an embodiment of the present invention, the compound represented by Formula (I) may be preferably grafted to the polyamide layer. When the compound represented by Formula (I) and the polyamide layer undergo a graft reaction to form a covalent bond, the surface passivation effect may be maintained for a longer time period compared to a passivation layer formed through physical absorption. In an embodiment, an amine end group of the compound represented by Formula (I) is covalently bonded to the polyamide layer.

Experimental data suggests that the absorption of fouling materials to the surface of the water-treatment separation membrane may be prevented due to the oil repellency of a fluorine terminal group. The effect of preventing biofouling due to organic materials may be strong when the passivation layer including the compound represented by Formula (I) is formed on the polyamide layer.

In an embodiment, a water-treatment separation membrane has a salt rejection rate of 99% or above when measured after 6 hours of adding a casein mixed aqueous solution at 100 ppm under a pressure of 800 psi, a permeation flux of 38 gfd, and excellent antifouling properties.

In addition, the initial permeation flux of a water-treatment separation membrane of an embodiment of the present invention may be 80% or more of the initial permeation flux of a water-treatment separation membrane without a passivation layer. A water-treatment separation membrane according to an embodiment of the present invention has a higher initial permeation flux than separation membranes that use a conventional passivation layer, and has good water purifying performance and antifouling properties.

A water-treatment membrane according to an embodiment of the present invention may be formed by a manufacturing method including providing a support having pores including a polyamide layer formed thereon, and forming a passivation layer including a compound represented by Formula (I) on the polyamide layer.

In such an embodiment, the support having pores including the polyamide layer formed thereon may be obtained by purchasing a commercially available polyamide separation membrane, or by manufacturing a polyamide-based water-treatment separation membrane according to known methods. For example, the support having pores with the polyamide layer may be formed by impregnating a support having pores with a m-phenylenediamine (mPD) aqueous solution to form an mPD layer, and impregnating the mPD layer with a trimesoyl chloride (TMC) organic solution so that the mPD layer contacts the TMC to conduct interfacial polymerization, thereby forming an active polyamide layer.

In other embodiments, the active polyamide layer may be formed through a spray method or a coating method instead of impregnation.

Forming a passivation layer including a compound represented by Formula (I) may be conducted by, for example, impregnating the support including the polyamide layer formed thereon with an aqueous solution including the compound represented by Formula (I). In such an embodiment, the preferred amount of the compound represented by Formula (I) is 0.01 to 10 wt % based on the total amount of the aqueous solution. When the amount of the compound represented by Formula (I) is less than 0.01 wt %, the antifouling effect is insignificant, and when the amount of the compound exceeds 10 wt %, the permeation flux of the water-treatment membrane may be deteriorated due to excessive surface bonds. In consideration of both water purifying properties and antifouling properties, the amount of the compound represented by Formula (I) may be, more preferably, 0.01 to 5 wt % based on the total amount of the aqueous solution.

The impregnating time may be from 0.1 minutes to 10 hours, and more preferably, from 1 minute to 1 hour. When the impregnating time is less than 0.1 minutes, the mass of the passivation layer may not be sufficient to impart substantial antifouling properties. On the other hand, when the impregnating time exceeds 10 hours, the mass of the passivation layer may decrease the permeation flux of the water-treatment membrane to unacceptable levels.

Embodiments of a water-treatment separation membrane manufactured by the above-described method may be used for various applications such as micro filtration, ultra filtration, nano filtration, reverse osmosis, and the like.

Embodiments of the present invention include a water-treatment module including at least one water-treatment separation membrane with a passivation layer according to Formula (I). Various examples of water treatment modules include a plate & frame module, a tubular module, a hollow & fiber module, a spiral wound module, and the like. The structure and the manufacturing method of the water-treatment module are not specifically limited so long as the water-treatment module includes a water-treatment separation membrane according to an embodiment of the present invention. Modules that are known in the art may be applied without limitation.

Figure 2:
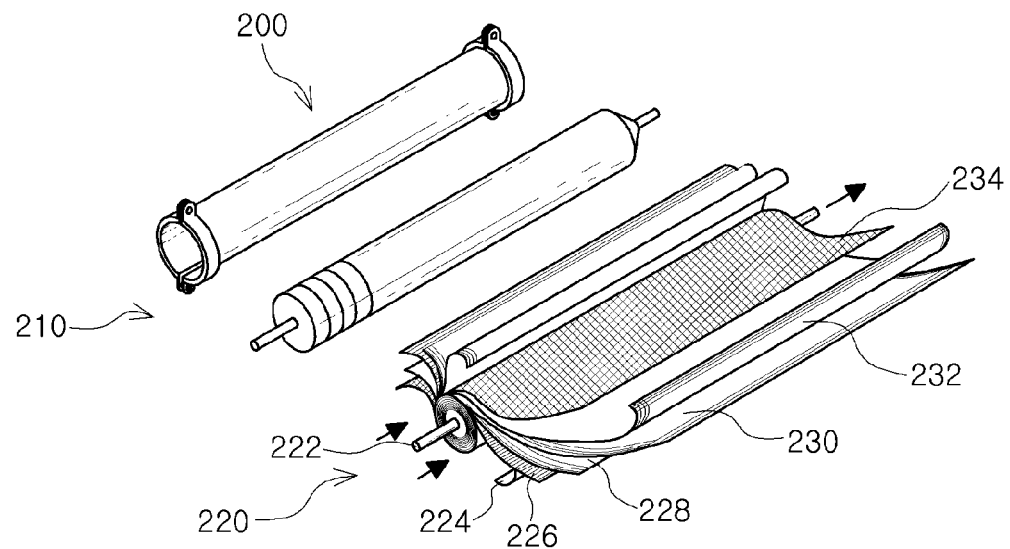
FIG. 2 illustrates an exploded view of an example of a water treatment module, including a module housing and a spiral filter.
Figure 3:
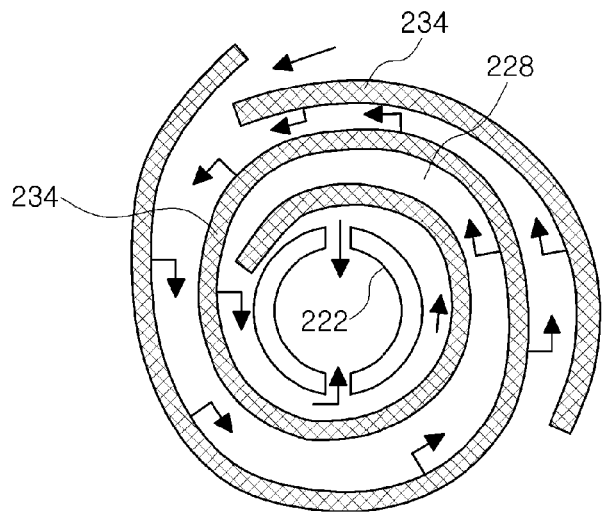
FIG. 3 illustrates a cross sectional view of the spiral filter of FIG. 2, including flow of permeate.

For example, FIG. 2 illustrates an exploded view of an example of a water treatment module 200 including a module housing 210 and a spiral filter 220. The water treatment module 200 houses a spiral filter 220 comprising a hollow perforated core 222 about which is wound with at least one layer of separation membranes and spacing material. The separation membrane and spacing material are arranged to form the multi-layered filter 220. The filter 220 comprises a separation membrane 224 that is supported by a backing 226 which is adhesively attached to a porous permeate carrier 228. The carrier 228 is adhesively attached to a second backing 230 that supports a second separation membrane 232. A mesh spacer 234 is placed over the second separation membrane 232 as the multi-layer filter is wound about the hollow perforated core 222. FIG. 3 illustrates a cross sectional view of the multi-layer filter and the core of FIG. 2.

A water-treatment module according to an embodiment of the present invention may be applied in a water-treatment apparatus such as a domestic or industrial water purifying apparatus, a sewage treatment apparatus, a sea water treatment apparatus, and the like.

solution at room temperature for 2 minutes, washed again using distilled water for 1 minute, and dried to form a passivation layer.

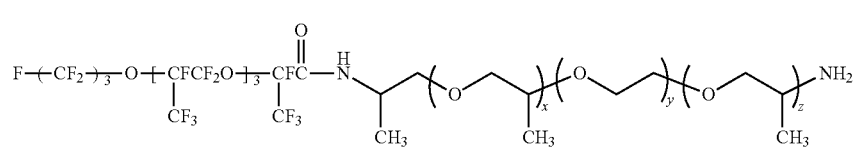

<Compound A>

Figure 4:
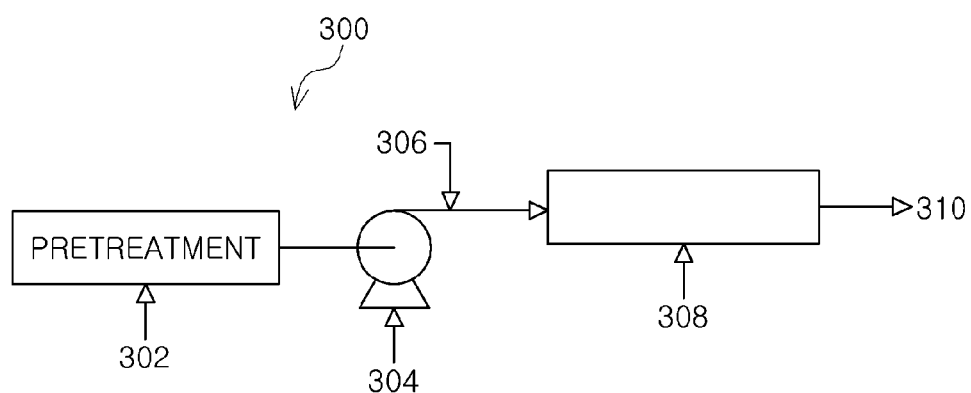
FIG. 4 illustrates a simplified schematic view of an example of a water treatment apparatus.

For example, FIG. 4 illustrates a simplified schematic view of an example of a water treatment apparatus 300. As shown FIG. 4, pretreated water 302 is supplied to a liquid pump 304 where the pressure of the flow is increased accordingly. Then, high pressure saline liquid 306 enters the water treatment module 308, and the discharge flow is converted from saline water to very saline water 310.

Hereinafter, specific embodiments of the present invention will be described in more detail.

Preparation Example—Forming a Support Having Pores with a Polyamide Layer 18 wt % of polysulfone in a solid form was added to an N,N-dimethylformamide (DMF) solution and dissolved at 80° C. to 85° C. for 12 hours to obtain a homogeneous solution. The resulting solution was cast on a non-woven fabric of a polyester material having a thickness of 95 to 100 μm to form a 150 μm thick polysulfone layer. Then, the cast non-woven fabric was immersed in water to form a porous polysulfone support.

The porous polysulfone support was immersed in an aqueous solution including 2 wt % of m-phenylenediamine for 2 minutes and was removed from the solution. Excess aqueous solution was removed using a roller at a pressure of 25 psi, and the support was dried at room temperature for 1 minute.

Then, the support was immersed in a 0.1 wt % of trimesoyl chloride organic solution including an ISOL-C (SK Chem.) solvent for 1 minute. The support was removed Where y=~39, and x+Z=~6.

Compound A was prepared by dissolving the following Reactant A1 in water, adding the following Reactant A2 at a 1:1 molar ratio, and mixing.

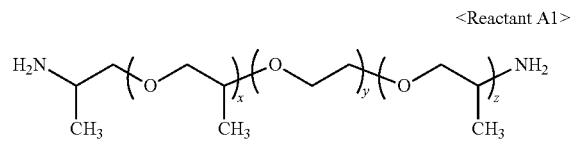

<Reactant A1>

Where y=~39, and x+Z=~6.

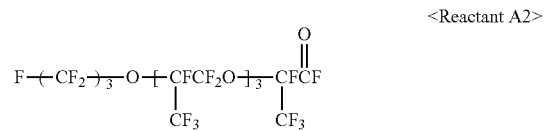

<Reactant A2>

Example 2

A passivation layer was formed by conducting the same procedure explained in Example 1 except that 0.5 wt % of Compound B having the following structure was used instead of Compound A.

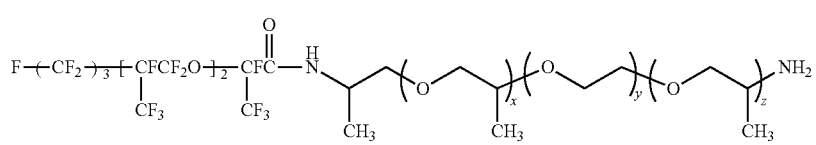

<Compound B> and dried in an oven at 60° C. for 10 minutes. Afterwards, the support was washed using a 0.2 wt % sodium carbonate aqueous solution at room temperature for 2 hours, and then washed using distilled water to obtain a support having pores including a polyamide layer with a thickness of 200 nm.

Example 1

A separation membrane prepared according to the Preparation Example process described above was immersed in an aqueous solution including 1 wt % of Compound A with the structure shown below for 1 minute. Next, the membrane was washed using a 0.2 wt % of sodium carbonate aqueous Where y=~39, and x+Z=~6.

Compound B was prepared by dissolving the following Reactant B1 in water, adding the following Reactant B2 at a 1:1 molar ratio, and mixing.

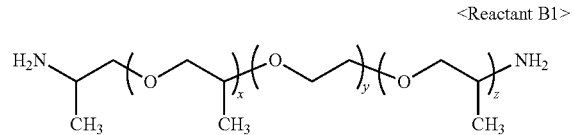

<Reactant B1>

Where y=~39, and x+Z=~6.

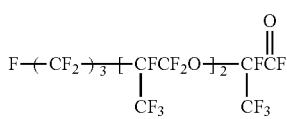

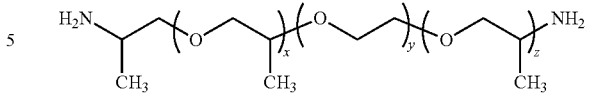

Where y=~39, and x+Z=~6.

Example 3

A passivation layer was formed by conducting the same procedure explained in Example 1, except that 0.1 wt % of Compound C having the following structure was used instead of Compound A.

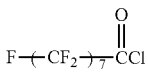

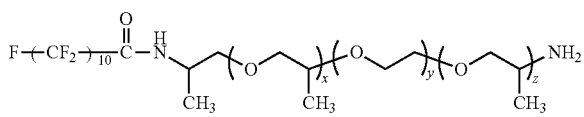

Where y=~13, and x+Z=~6.

Compound C was prepared by dissolving the following Reactant C1 in water, adding the following Reactant C2 at a 1:1 molar ratio, and mixing.

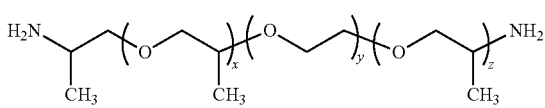

Where y=~13, and x+Z=~6.

Example 5

A passivation layer was formed by conducting the same procedure explained in Example 1 except that 0.1 wt % of Compound E having the following structure was used instead of Compound A.

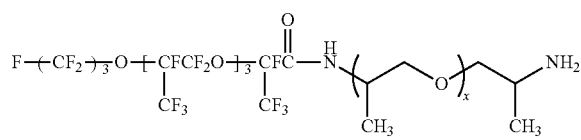

Where x=~33.

Compound E was prepared by dissolving the following Reactant E1 in water, adding the following Reactant E2 at a 1:1 molar ratio, and mixing.

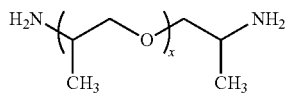

Where x=~33.

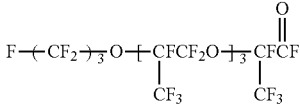

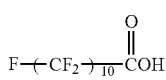

Example 4

A passivation layer was formed by conducting the same procedure explained in Example 1 except that 1 wt % of Compound D having the following structure was used instead of Compound A.

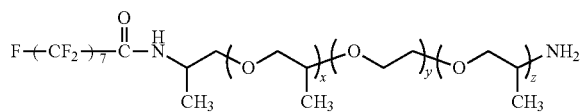

Where y=~39, and x+Z=~6.

Compound D was prepared by dissolving the following Reactant D1 in water, adding the following Reactant D2 at a 1:1 molar ratio, and mixing.

Example 6

A passivation layer was formed by conducting the same procedure explained in Example 1 except that 1 wt % of Compound F having the following structure was used instead of Compound A.

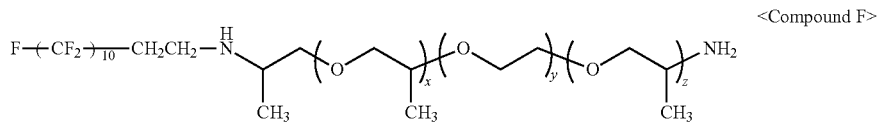
<Compound F>

Where y=~39, and x+Z=~6.

Compound F was prepared by dissolving the following Reactant F1 in water, adding the following Reactant F2 at a 1:1 molar ratio, and mixing.

<Reactant F1>

Where y=~39, and x+Z=~6.

<Reactant F2>
F—(CF$_2$)$_{10}$—CH$_2$CH$_2$OH

Example 7

A passivation layer was formed by conducting the same procedure explained in Example 1 except that 2 wt % of Compound G having the following structure was used instead of Compound A.

<Compound G>

Where y=~13, and x+Z=~6.

Compound G was prepared by dissolving the following Reactant G1 in water, adding the following Reactant G2 at a 1:1 molar ratio, and mixing.

<Reactant G1>
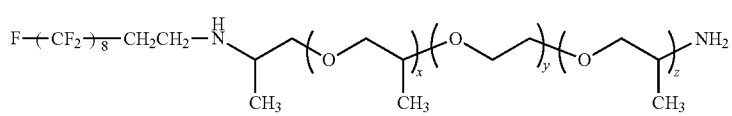

Where y=~13, and x+Z=~6.

<Reactant G2>
F—(CF$_2$)$_8$—CH$_2$CH$_2$OH

Example 8

A passivation layer was formed by conducting the same procedure explained in Example 1 except that 1 wt % of Compound H having the following structure was used instead of Compound A.

<Compound H>
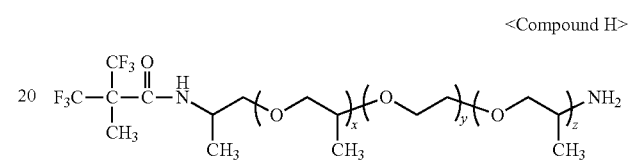

Where y=~13, and x+Z=~6.

Compound H was prepared by dissolving the following Reactant H1 in water, adding the following Reactant H2 at a 1:1 molar ratio, and mixing.

<Reactant H1>
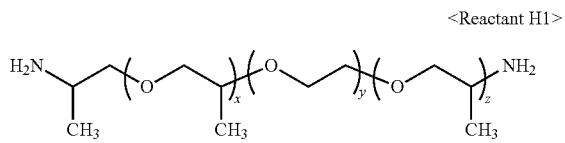

Where y=~13, and x+Z=~6.

<Reactant H2>
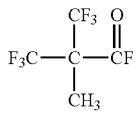

Example 9

A passivation layer was formed by conducting the same procedure explained in Example 1 except that 0.1 wt % of Compound I having the following structure was used instead of Compound A.

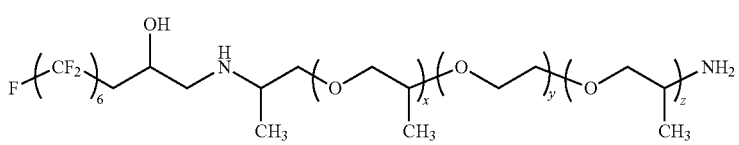

<Compound I>

Where y=~39, and x+Z=~6.

Compound I was prepared by dissolving the following Reactant I1 in water, adding the following Reactant I2 at a 1:1 molar ratio, and mixing.

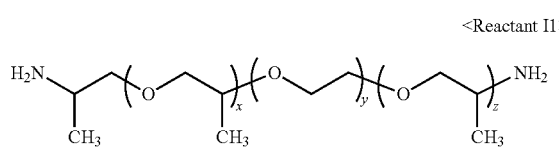

<Reactant I1>

Where y=~39, and x+Z=~6.

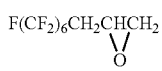

<Reactant I2>

Example 10

A passivation layer was formed by conducting the same procedure explained in Example 1 except that 1 wt % of Compound J having the following structure was used instead of Compound A.

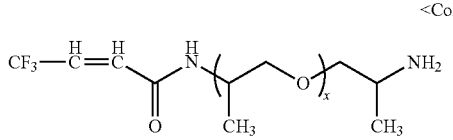

<Compound J>

Where x=~33.

Compound J was prepared by dissolving the following Reactant J1 in water, adding the following Reactant J2 at a 1:1 molar ratio, and mixing.

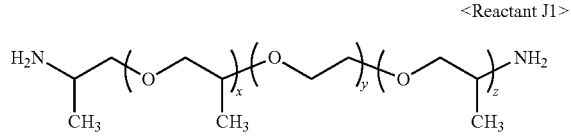

<Reactant J1>

Where x=~33.

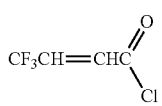

<Reactant J2>

Example 11

A passivation layer was formed by conducting the same procedure explained in Example 1 except that 0.2 wt % of Compound K having the following structure was used instead of Compound A.

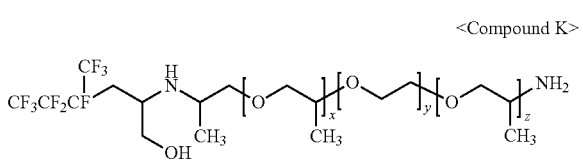

<Compound K>

Where y=~13, and x+Z=~6.

Compound K was prepared by dissolving the following reactant K1 in water, adding the following Reactant K2 at a 1:1 molar ratio, and mixing.

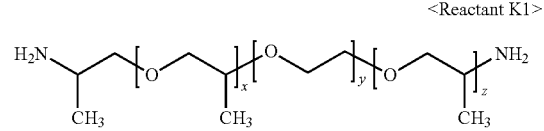

<Reactant K1>

Where y=~13, and x+Z=~6.

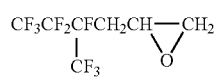

<Reactant K2>

Example 12

A passivation layer was formed by conducting the same procedure explained in Example 1 except that 0.1 wt % of Compound L having the following structure was used instead of Compound A.

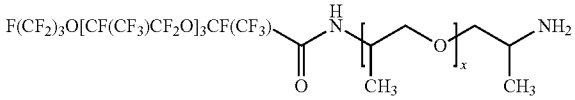

<Compound L>

Where x=~33.

The Compound L was prepared by dissolving the following reactant L1 in water, adding the following Reactant L2 at a 1:1 molar ratio, and mixing.

<Reactant L1>

H$_2$N–CH(CH$_3$)–[CH$_2$–O–CH(CH$_3$)]$_x$–NH$_2$

Where x=~33.

F(CF$_2$)$_3$O[CF(CF$_3$)CF$_2$O]$_3$CF(CF$_3$)COF  <Reactant L2>

Example 13

A passivation layer was formed by conducting the same procedure explained in Example 1 except that 1 wt % of Compound M having the following structure was used instead of Compound A.

<Compound M>

CF$_3$(CF$_2$)$_5$C(O)–C$_6$H$_4$–C(O)–NH–CH(CH$_3$)–[O–CH$_2$CH(CH$_3$)]$_x$–[O–CH$_2$CH$_2$]$_y$–[O–CH$_2$CH(CH$_3$)]$_z$–NH$_2$

Where y=~39, and x+Z=~6.

Compound M was prepared by dissolving the following reactant M1 in water, adding the following Reactant M2 at a 1:1 molar ratio, and mixing.

<Reactant M1>

H$_2$N–CH(CH$_3$)–[O–CH$_2$CH(CH$_3$)]$_x$–[O–CH$_2$CH$_2$]$_y$–[O–CH$_2$CH(CH$_3$)]$_z$–NH$_2$

Where y=~39, and x+Z=~6.

<Reactant M2>

CF$_3$(CF$_2$)$_5$C(O)–C$_6$H$_4$–C(O)Cl

Example 14

A passivation layer was formed by conducting the same procedure explained in Example 1 except that 1 wt % of Compound N having the following structure was used instead of Compound A.

<Compound N>

FSO$_2$CF$_2$CF$_2$OCF(CF$_3$)CF$_2$OCF(CF$_3$)C(O)–NH–CH(CH$_3$)–[O–CH$_2$CH(CH$_3$)]$_x$–[O–CH$_2$CH$_2$]$_y$–[O–CH$_2$CH(CH$_3$)]$_z$–NH$_2$

Where y=~39, and x+Z=6.

Compound N was prepared by dissolving the following reactant N1 in water, adding the following Reactant N2 at a 1:1 molar ratio, and mixing.

<Reactant N1>

H$_2$N–CH(CH$_3$)–[O–CH$_2$CH(CH$_3$)]$_x$–[O–CH$_2$CH$_2$]$_y$–[O–CH$_2$CH(CH$_3$)]$_z$–NH$_2$

Where y=~39, and x+Z=~6.

<Reactant N2>

FSO$_2$CF$_2$CF$_2$OCF(CF$_3$)CF$_2$OCF(CF$_3$)COF

Example 15

A passivation layer was formed by conducting the same procedure explained in Example 1 except that 5 wt % of Compound O having the following structure was used instead of Compound A.

<Compound O>

F(CF$_2$)$_6$CH$_2$–NH–CH$_2$CH(OH)CH$_2$–[O–CH$_2$CH$_2$]$_q$–O–CH$_2$–(epoxide)

Where q=9.

Compound O was prepared by dissolving the following reactant O1 in water, adding the following Reactant O2 at a 1:1 molar ratio, and mixing.

<Reactant O1>

(epoxide)–CH$_2$–[O–CH$_2$CH$_2$]$_q$–O–CH$_2$–(epoxide)

Where q=9.

F(CF$_2$)$_6$CH$_2$NH$_2$  <Reactant O2>

Comparative Example

The separation membrane prepared according to the Preparation Example was washed using a 0.2 wt % sodium carbonate aqueous solution at room temperature for 2 minutes, washed again using distilled water for 1 minute, and dried.

Experimental Example—Evaluation of Antifouling Properties

Antifouling properties of the water-treatment separation membranes manufactured according to Examples 1 to 15 and Comparative Example were evaluated using the following methods.

The evaluation of the antifouling properties was conducted by using an aqueous mixture solution of 32,000 ppm of NaCl and 100 ppm of casein under a pressure of 800 psi. Initial salt rejection and permeation flux were measured, and an aqueous solution of 100 ppm of casein was added to an evaluating tank. After operating for 6 hours, the salt rejection and the flux were measured again.

The initial salt rejection and the initial permeation flux were measured while supplying an aqueous solution of sodium chloride including 32,000 ppm with the flux of 4,500 mL/min at 25° C. at 800 psi. The water-treatment membrane cell apparatus used for the evaluation of the membrane was provided with a flat panel permeation cell, a high pressure pump, a storing bath and a cooling apparatus. The flat panel permeation cell has a cross-flow type structure and an effective permeation area of 140 cm$^2$. The washed water-treatment membrane was installed in the permeation cell, and a preliminary operation was conducted for about 1 hour using 3rd distilled water to stabilize the evaluation apparatus.

Initial flux was measured using an aqueous solution with 32,000 ppm of sodium chloride. The saline solution was processed for about one hour until the pressure and flux stabilized. After stabilization, 100 ppm of casein was added to the solution, and flux was measured by recording the volume of fluid that passed through the membrane in 10 minutes. The solution was processed for 6 hours after adding casein, and the flux was determined based on the volume of fluid passing through the membrane in 10 minutes. The salt concentration was analyzed by using a conductivity meter before and after permeation to calculate the salt rejection.

The results of the evaluation are illustrated in the following Table 1.

TABLE 1

|  | Initial flux immediately after adding casein (GFD) | Flux 6 hours after adding casein (GFD) | Salt rejection immediately after adding casein (%) | Salt rejection 6 hours after adding casein (%) |
| --- | --- | --- | --- | --- |
| Example 1 | 44.01 | 43.89 | 99.52 | 99.71 |
| Example 2 | 42.28 | 41.03 | 99.35 | 99.63 |
| Example 3 | 39.96 | 39.17 | 99.48 | 99.68 |
| Example 4 | 40.36 | 39.73 | 99.22 | 99.31 |
| Example 5 | 42.76 | 40.51 | 99.15 | 99.29 |
| Example 6 | 39.92 | 38.35 | 99.38 | 99.51 |
| Example 7 | 41.24 | 39.41 | 99.41 | 99.50 |
| Example 8 | 40.65 | 38.77 | 99.26 | 99.47 |
| Example 9 | 42.13 | 37.25 | 99.00 | 99.14 |
| Example 10 | 41.59 | 38.72 | 99.14 | 99.38 |
| Example 11 | 42.35 | 37.28 | 99.43 | 99.45 |
| Example 12 | 43.57 | 37.32 | 99.32 | 99.61 |
| Example 13 | 44.47 | 39.36 | 99.12 | 99.38 |
| Example 14 | 42.43 | 37.01 | 99.04 | 99.23 |
| Example 15 | 43.02 | 38.73 | 99.15 | 99.36 |
| Comparative Example | 48.12 | 35.60 | 98.12 | 98.14 |

As illustrated in Table 1, the water-treatment separation membranes of Examples 1 to 15 exhibit a relatively low decrease in flux after adding casein, which indicates improved antifouling properties relative to the decrease in flux of the Comparative Example.

While embodiments of the present invention have been shown and described in connection with specific examples, it will be apparent to those skilled in the art that modifications and variations can be made without departing from the spirit and scope of the invention as defined by the appended claims.

What is claimed is:

1. A water-treatment separation membrane comprising:
    a support having pores;
    a polyamide layer formed on the support; and
    a passivation layer formed on the polyamide layer, the passivation layer including a compound represented by following formula (I), $$L_1\text{-}A\text{-}L_2\text{-}B\text{-}L_3,\qquad\text{[Formula I]}$$

in which $L_1$ is an amine, a haloalkyl, a haloalkenyl, a haloalkynyl, a hydroxyl, a ketone, an aldehyde, an acyl halide, a carbonate, an ester, an ether, an imine, an azide, a nitrile, a thiocyanate, a thione, a thial, a phosphate, an epoxide, an acryloyl amine or a thiol,
    A includes one or more C1-6 alkylene unit, one or more C1-6 alkylene oxide unit or a combination thereof,
    $L_2$ is at least one selected from the group consisting of following formulae (II) to (V),

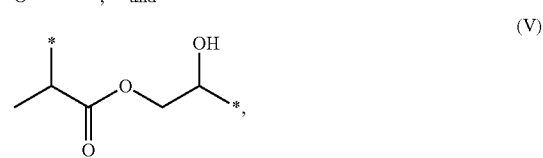

B is an unsubstituted $C_{1\text{-}20}$ alkylene, aryl alkylene, alkylene oxide, alkenylene, aryl alkenylene or alkenylene oxide or a substituted $C_{1\text{-}20}$ alkylene, aryl alkylene, alkylene oxide, alkenylene, aryl alkenylene or alkenylene oxide in which the alkylene, the aryl alkylene, the alkylene oxide, the alkenylene, the aryl alkenylene or the alkenylene oxide is substituted with at least one selected from a group consisting of a halogen, a sulfonyl, an amine, a hydroxyl and a ketone, and
    $L_3$ is —$CF_3$ or —F.

2. The water-treatment separation membrane of claim 1, wherein A is at least one selected from a group consisting of the following formulae (VI) to (XII):

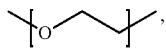 (VI)

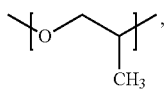 (VII)

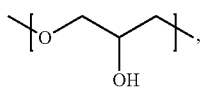 (VIII)

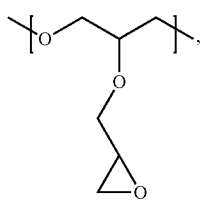 (IX)

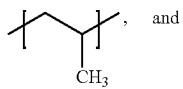 and (X)

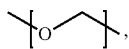 (XI)

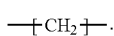 . (XII)

3. The water-treatment separation membrane of claim 1, wherein B is at least one selected from a group consisting of following compounds, in which n is 1 to 10 and m is 0 to 10:

——$(CF_2)_n(CH_2)_m$——

——$(CF_2)_3OCF(CF_3)CH_2$——,

——$CF_2CHFCF_2CH_2$——, ——$CF_2CHF$——,

——$(CF_2)_3[CF(CF_3)CF_2O]_2CF(CF_3)$——,

——$(CF_2)_3O[CF(CF_3)CF_2O]_3CF(CF_3)$——,

——$(CF_2)_6CH=CH$——, ——$CF_2OCF_2CF_2$——,

——$CF_2CF_2CH_2OCH_2$——, ——$CF_2CHFCF_2$——,

——$(CF_2)_3CH=CH$——, ——$CF_2CH_2CH=CH$——,

——$CF_2CF_2CF=CF$——, ——$CF_2CH=CH$——,

——$CF=CFCH_2CH_2$——, ——$CF_2$—$CF(CF_2)_2(CH_2)_2$——
$\phantom{CF=CFCH_2CH_2CF_2CF(CF_2)_2(CH_2)_2}|$
$\phantom{CF=CFCH_2CH_2CF_2CF(CF_2)_2(CH_2)_2}CF_3$ ——$CF_2CF$——, ——$CF_2CF$——,
$\phantom{CF_2CF}|$ $\phantom{CF_2CF}|$
$\phantom{CF_2CF}Br$ $\phantom{CF_2CF}Cl$ ——$SO_2CF_2CF_2OCFCF_2OCF$——, ——$SO_2CF_2CF_2OCF$——,
$\phantom{SO_2CF_2CF_2OCFCF_2OCF}| \phantom{xx} |$ $\phantom{SO_2CF_2CF_2OCFxx}|$
$\phantom{SO_2CF_2CF_2OCFCF_2OCF}CF_3 \phantom{x} CF_3$ $\phantom{SO_2CF_2CF_2OCFxx}CF_3$ ——$CF_2CFCF=CF$——, ——$CF_2CF_2CFCH_2$——,
$\phantom{CF_2CFCF=CF}|$ $\phantom{CF_2CF_2CFCH_2}|$
$\phantom{CF_2CFCF=CF}CF_3$ $\phantom{CF_2CF_2CFCH_2}CF_3$ ——$CF_2CF_2CFCH_2CH_2$——, ——$CF_2CF_2CFCH=CH$——,
$\phantom{CF_2CF_2CFCH_2CH_2}|$ $\phantom{CF_2CF_2CFCH=CH}|$
$\phantom{CF_2CF_2CFCH_2CH_2}CF_3$ $\phantom{CF_2CF_2CFCH=CH}CF_3$ ——$CF_2CF(CH_2)_6$——, ——$CF_2CFCH=CH$——,
$\phantom{CF_2CF(CH_2)_6}|$ $\phantom{CF_2CFCH=CH}|$
$\phantom{CF_2CF(CH_2)_6}CF_3$ $\phantom{CF_2CFCH=CH}OCF_3$ ——$CF_2CF(CF_2)_4(CH_2)_2$——, ——$CF_2CF(CF_2)_6(CH_2)_2$——,
$\phantom{CF_2CF(CF_2)_4(CH_2)_2}|$ $\phantom{CF_2CF(CF_2)_6(CH_2)_2}|$
$\phantom{CF_2CF(CF_2)_4(CH_2)_2}CF_3$ $\phantom{CF_2CF(CF_2)_6(CH_2)_2}CF_3$ ——$CF_2CH_2CH$——, ——$CF_2CHCH_2$——,
$\phantom{CF_2CH_2CH}|$ $\phantom{CF_2CHCH_2}|$
$\phantom{CF_2CH_2CH}CH_3$ $\phantom{CF_2CHCH_2}CH_3$ ——$CF_2CF_2CF_2OCF$——, ——$CF_2CF_2CF_2OCFCH_2CH_2$——,
$\phantom{CF_2CF_2CF_2OCF}|$ $\phantom{CF_2CF_2CF_2OCFCH_2CH_2}|$
$\phantom{CF_2CF_2CF_2OCF}CF_3$ $\phantom{CF_2CF_2CF_2OCFCH_2CH_2}CF_3$ ——$CF_2CFCH_2CH_2$——, ——$CF_2OCFCH_2$——,
$\phantom{CF_2CFCH_2CH_2}|$ $\phantom{CF_2OCFCH_2}|$
$\phantom{CF_2CFCH_2CH_2}OCF_3$ $\phantom{CF_2OCFCH_2}CF_3$ ——$CF_2CFCH_2CH_2$——, ——$CF_2CH$——,
$\phantom{CF_2CFCH_2CH_2}|$ $\phantom{CF_2CH}|$
$\phantom{CF_2CFCH_2CH_2}CF_3$ $\phantom{CF_2CH}CF_3$ ——$CF_2CF_2CF_2OCFCH=CH$——,
$\phantom{CF_2CF_2CF_2OCFCH=CH}|$
$\phantom{CF_2CF_2CF_2OCFCH=CH}CF_3$ ——$CF_2CF_2CF_2OCFCH_2$——, ——$CF_2CF$——,
$\phantom{CF_2CF_2CF_2OCFCH_2}|$ $\phantom{CF_2CF}|$
$\phantom{CF_2CF_2CF_2OCFCH_2}CF_3$ $\phantom{CF_2CF}OCF_3$ ——$CF_2CFCH=CH$——, ——$CF_2C$—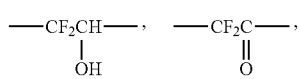—,
$\phantom{CF_2CFCH=CH}|$ $\phantom{CF_2C}\|$
$\phantom{CF_2CFCH=CH}CF_3$ $\phantom{CF_2C}O$ ——$CF_2CF_2CF_2CF$——, ——$CF_2(CF_2)_5C$—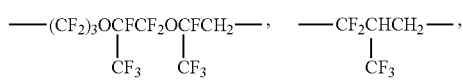—,
$\phantom{CF_2CF_2CF_2CF}|$ $\phantom{CF_2(CF_2)_5C}\|$
$\phantom{CF_2CF_2CF_2CF}SO_2F$ $\phantom{CF_2(CF_2)_5C}O$ ——$CF_2CH$——, ——$CF_2C$——,
$\phantom{CF_2CH}|$ $\phantom{CF_2C}\|$
$\phantom{CF_2CH}OH$ $\phantom{CF_2C}O$ ——$(CF_2)_3OCFCF_2OCFCH_2$——, ——$CF_2CHCH_2$——,
$\phantom{(CF_2)_3OCFCF_2OCFCH_2}| \phantom{xx} |$ $\phantom{CF_2CHCH_2}|$
$\phantom{(CF_2)_3OCFCF_2OCFCH_2}CF_3 \phantom{x} CF_3$ $\phantom{CF_2CHCH_2}CF_3$ ——$CF_2C=CH$——, ——$(CFCF_2O)_2CF$——,
$\phantom{CF_2C=CH}|$ $\phantom{(CFCF_2O)_2CF}| \phantom{xx} |$
$\phantom{CF_2C=CH}CF_3$ $\phantom{(CFCF_2O)_2CF}CF_3 \phantom{x} CF_3$ ——$(CFCF_2O)_4CF$——, ——$(CFCF_2O)_3CF$——,
$\phantom{(CFCF_2O)_4CF}| \phantom{xx} |$ $\phantom{(CFCF_2O)_3CF}| \phantom{xx} |$
$\phantom{(CFCF_2O)_4CF}CF_3 \phantom{x} CF_3$ $\phantom{(CFCF_2O)_3CF}CF_3 \phantom{x} CF_3$ $\phantom{CF_2CFxxxxxxxx}CF_3$
$\phantom{CF_2CFxxxxxxxx}|$
——$CF_2CF$——, ——$CF_2CHCH$——,
$\phantom{CF_2CF}|$ $\phantom{CF_2CHCH}|$
$\phantom{CF_2CF}CF_3$ $\phantom{CF_2CHCH}NH_2$ $\phantom{CF_2C}CF_3$ $\phantom{CF_2C}CF_3$
$\phantom{CF_2C}|$ $\phantom{CF_2C}|$
——$CF_2C$——, and ——$CF_2C$——.
$\phantom{CF_2C}|$ $\phantom{CF_2C}|$
$\phantom{CF_2C}CH_3$ $\phantom{CF_2C}OH$ 4. The water-treatment separation membrane of claim 1, wherein the compound represented by formula (I) is selected from a group consisting of following compounds:

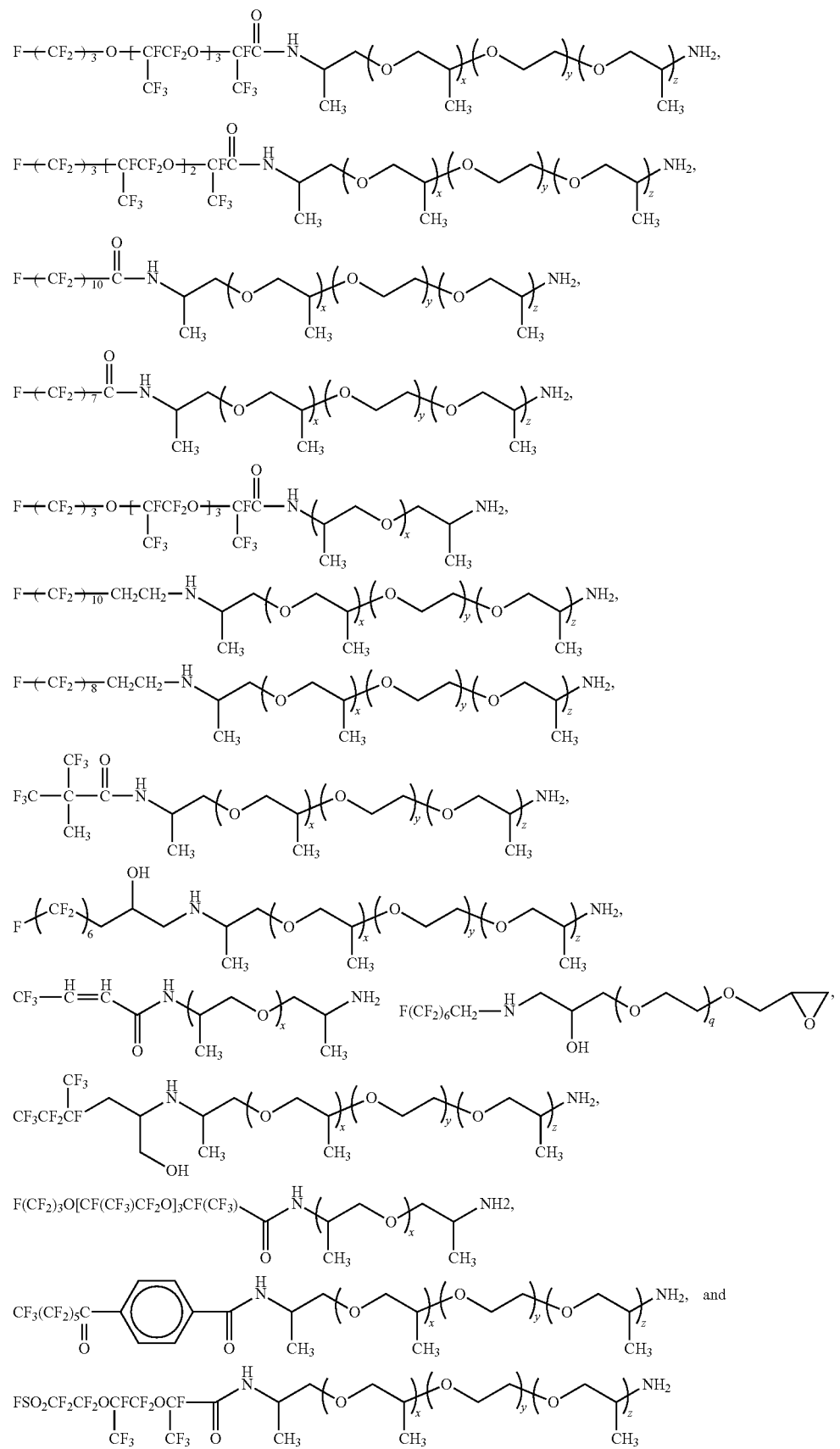

in which each of x, y and z is an integer from 0 to 70, x+y+z is an integer from 1 to 70, and q is an integer from 1 to 150.

5. The water-treatment separation membrane of claim 1, wherein the compound represented by formula (I) is grafted to the polyamide layer.

6. A method of forming a water-treatment separation membrane, the method comprising:
   providing a support having pores and a polyamide layer formed thereon; and
   forming a passivation layer including a compound represented by following formula (I) on the polyamide layer, $$L_1\text{-}A\text{-}L_2\text{-}B\text{-}L_3,\qquad \text{[Formula I]}$$

in which $L_1$ is an amine, a haloalkyl, a haloalkenyl, a haloalkynyl, a hydroxyl, a ketone, an aldehyde, an acyl halide, a carbonate, an ester, an ether, an imine, an azide, a nitrile, a thiocyanate, a thione, a thial, a phosphate, an epoxide, an acryloyl amine or a thiol, A includes one or more $C_{1-6}$ alkylene unit, one or more $C_{1-6}$ alkylene oxide unit or a combination thereof, $L_2$ is at least one selected from the group consisting of following formulae (II) to (V),

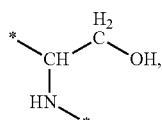

(II)

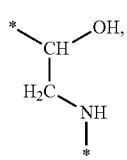

(III)

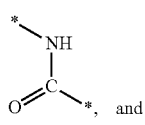

(IV)

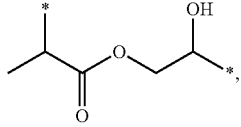

(V)

B is an unsubstituted $C_{1-20}$ alkylene, aryl alkylene, alkylene oxide, alkenylene, aryl alkenylene or alkenylene oxide or a substituted $C_{1-20}$ alkylene, aryl alkylene, alkylene oxide, alkenylene, aryl alkenylene or alkenylene oxide in which the alkylene, the aryl alkylene, the alkylene oxide, the alkenylene, the aryl alkenylene or the alkenylene oxide is substituted with at least one selected from a group consisting of a halogen, a sulfonyl, an amine, a hydroxyl and a ketone, and $L_3$ is —$CF_3$ or —F.

7. The method of claim 6, wherein forming the passivation layer comprises impregnating the support including the polyamide layer formed thereon with an aqueous solution including the compound represented by formula (I).

8. The method of claim 6, wherein forming the water treatment separation membrane comprises exposing the support to an aqueous solution including the compound represented by formula (I), and the aqueous solution includes 0.01 to 10 wt % of the compound represented by formula (I).

9. The method of claim 6, wherein A is at least one selected from a group consisting of the following formulae (VI) to (XII):

(VI)

(VII)

(VIII)

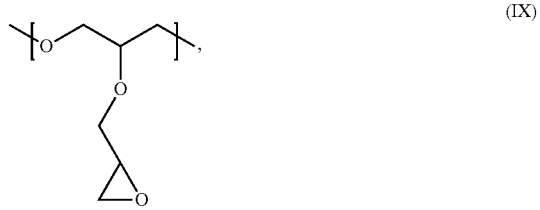

(IX)

(X)

(XI)

(XII)

10. The method of claim 6, wherein B is at least one selected from a group consisting of following compounds, in which n is an integer from 1 to 10 and m is an integer from 0 to 10:

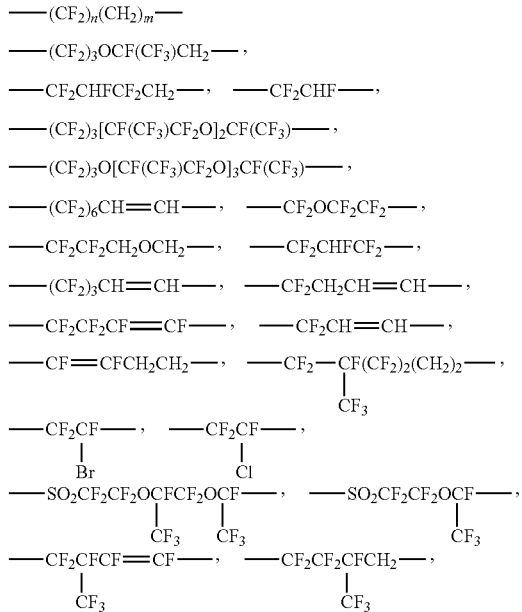

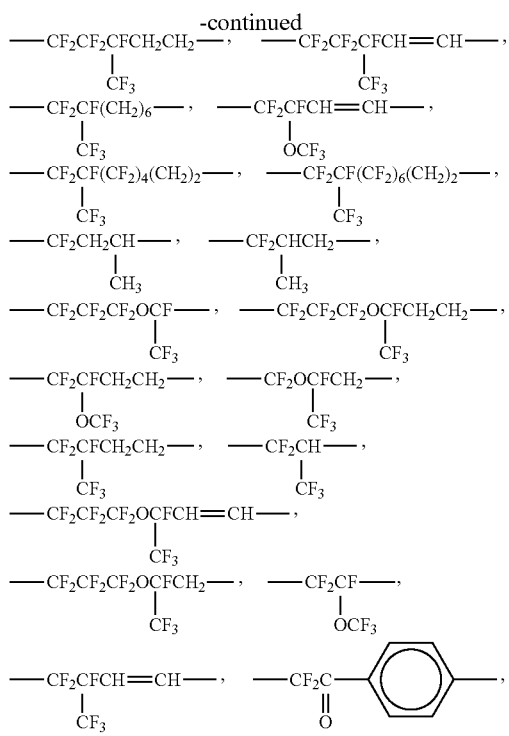
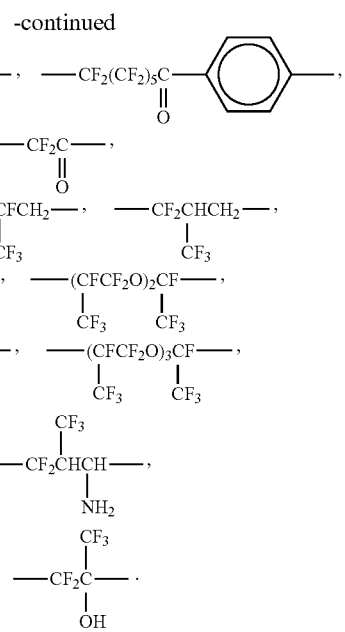
11. The method of claim 6, wherein the compound represented by formula (I) is selected from a group consisting of following compounds:
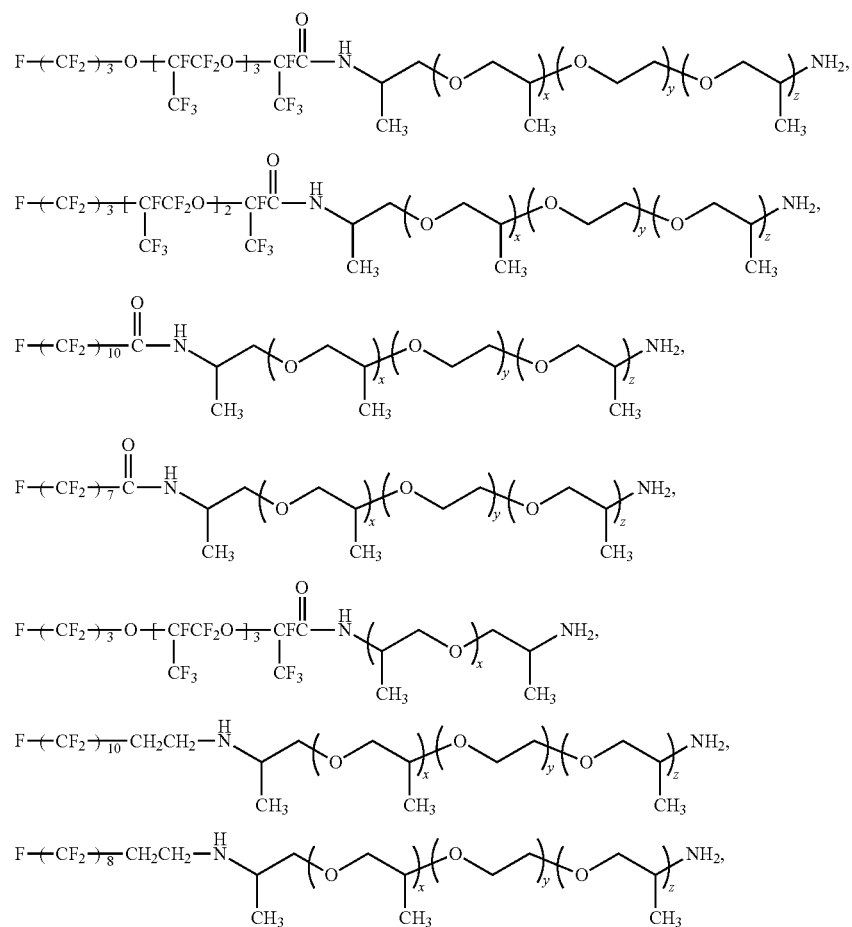

-continued

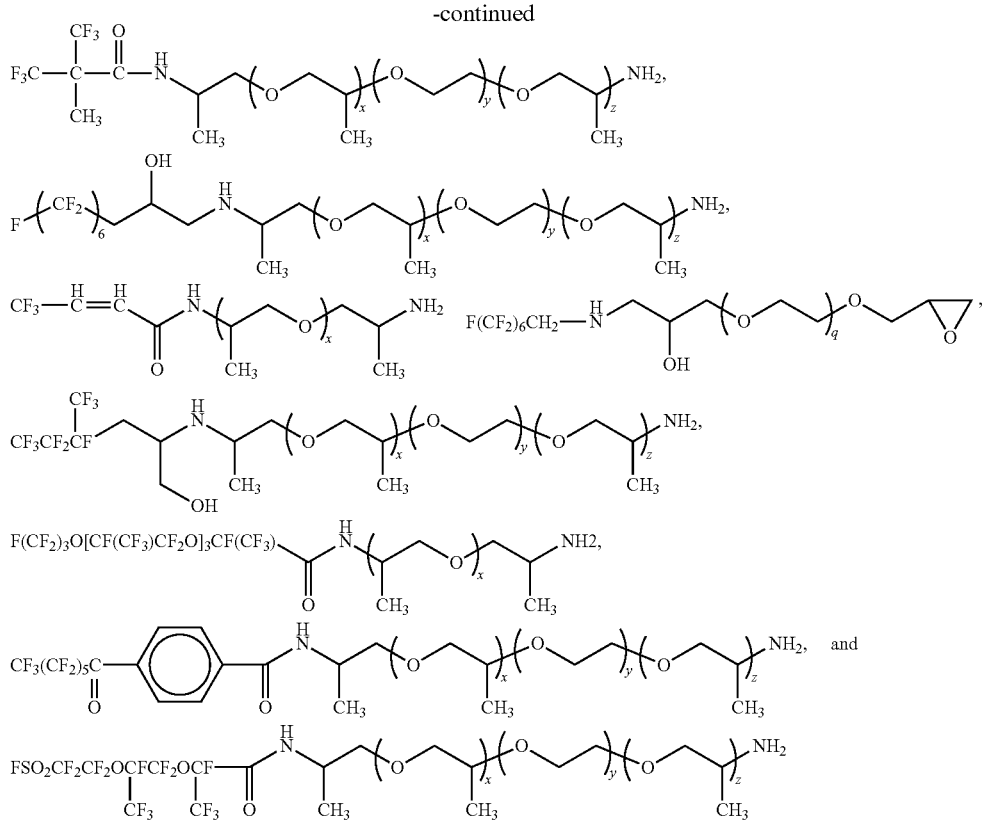

in which each of x, y and z is an integer from 0 to 70, x+y+z is an integer from 1 to 70, and q is an integer from 1 to 150.

12. The method of claim 6, wherein the compound represented by formula (I) is grafted to the polyamide layer.

13. A water-treatment module comprising the water-treatment separation membrane according to claim 1.

14. A water-treatment apparatus comprising the water-treatment module of claim 13.

* * * * *